United States Patent [19]

Meslener

[11] 4,088,885
[45] May 9, 1978

[54] METHOD AND APPARATUS FOR MODULATING AN OPTICAL SIGNAL

[75] Inventor: George J. Meslener, Acton, Mass.

[73] Assignee: GTE Laboratories Incorporated, Waltham, Mass.

[21] Appl. No.: 708,653

[22] Filed: Jul. 26, 1976

[51] Int. Cl.² .............................................. H04B 9/00
[52] U.S. Cl. .................................. 250/199; 332/7.51; 250/230; 350/DIG. 2; 358/200; 325/143
[58] Field of Search .................... 332/7.51, 9; 250/199, 250/230; 350/161, 285, DIG. 2; 370/312; 178/6, 7.1; 325/38 R, 143

[56] References Cited

U.S. PATENT DOCUMENTS

| | | | |
|---|---|---|---|
| 1,937,754 | 12/1933 | Gieskieng | 250/230 |
| 1,966,354 | 7/1934 | Noxon | 250/230 R |
| 1,981,999 | 11/1934 | French | 332/7.51 |
| 2,246,884 | 6/1941 | Johnson | 250/230 X |
| 2,304,055 | 12/1942 | Rich | 250/230 X |
| 3,055,258 | 9/1962 | Hurvitz | 325/143 |
| 3,329,474 | 7/1967 | Harris et al. | 350/DIG. 2 |
| 3,431,504 | 3/1969 | Adler | 250/199 |
| 3,622,791 | 11/1971 | Bernard | 250/199 |
| 3,903,496 | 9/1975 | Stimler | 250/199 |

OTHER PUBLICATIONS

Karp et al, "The Design of a Pulse Position Modulated Optical Communication System", 12/69, pp. 670–676, IEEE Trans. on Communication Technology, vol. Com. 17, #6.

Primary Examiner—Nelson Moskowitz
Attorney, Agent, or Firm—David M. Keay

[57] ABSTRACT

A method and apparatus for pulse position modulating an optical signal is disclosed whereby a beam of light is swept across an aperture at a predetermined rate to define a plurality of reference-time positions for the series of pulses emerging through the aperture. The reference-time positions are thereby associated with a reference sweep-path position. The sweep-path position at which the beam crosses the aperture is varied in accordance with a modulating signal to consequently vary the time positions of the emerging pulses.

In the preferred embodiment, a pair of reflective surfaces are provided in the beam path, the first being cyclically vibrated at a predetermined rate to repeatedly deflect the beam across the aperture. The second reflective surface is movable in response to a modulating signal to alter the angle of the beam incidence on the first surface and thereby alter the time phase of the vibration cycle at which the beam transverses the aperture.

3 Claims, 5 Drawing Figures

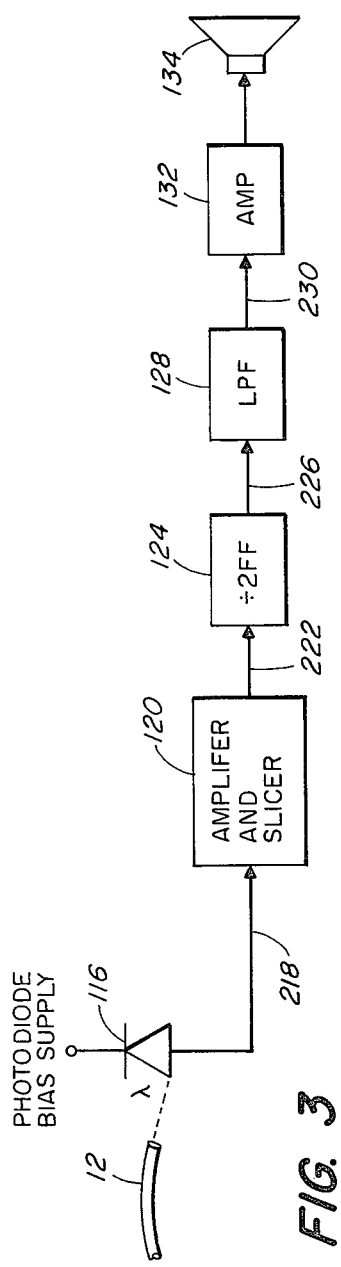
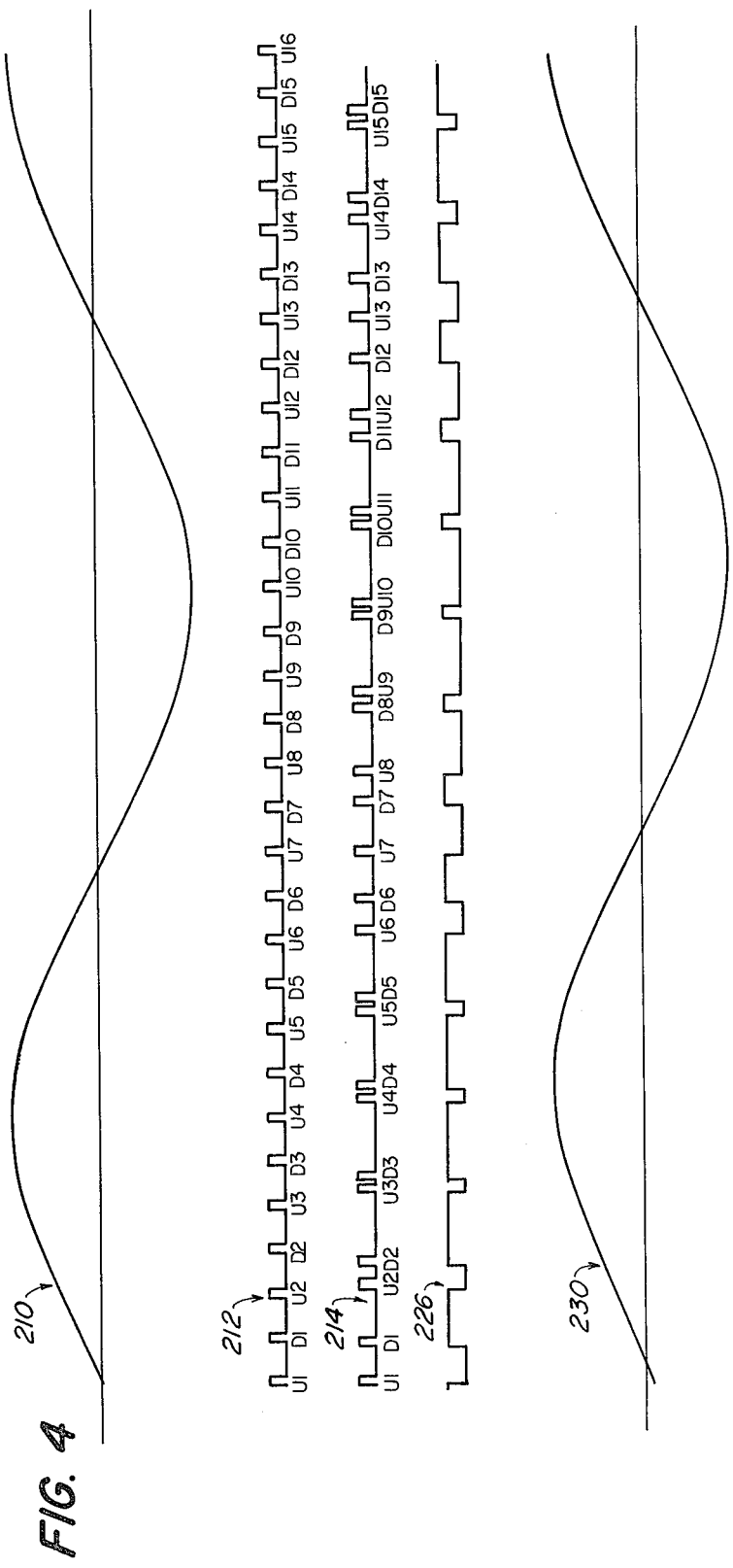

METHOD AND APPARATUS FOR MODULATING AN OPTICAL SIGNAL

FIELD OF THE INVENTION

This invention relates to optical communication systems and, more specifically, to an optical signal modulator. This invention is more particularly concerned with pulse position modulation (PPM) of an optical signal.

Pulse position modulation is an important form of modulation in optical communications whereby the occurrence time of an optical pulse is advanced or retarded, with respect to the pulses of a reference pulsetrain, in accordance with a modulating, or information bearing signal. PPM signals are more easily regenerated and retransmitted than amplitude- modulated signals and are less sensitive to non-linear distortions since the information is contained in the pulse position rather than its amplitude.

DESCRIPTION OF THE PRIOR ART

In the past, the PPM signal has been first generated electrically and then used to either intensity modulate a light source or control an optical modulator. It is undesirable to modulate many light sources, such as arc lamps, which have large time constants which severely limit the data transmission rate. Optical modulators are wavelength dependent and when used with broad spectrum sources, cause disperson of the light which renders the pulses indistinguishable beyond a limited transmission rate. Additionally, these modulators usually require high voltages and tend to be costly.

SUMMARY OF THE INVENTION

In its broadest aspect, the pulse position modulator of the present invention comprises means for forming a light beam, means defining an aperture, and first and second optical deflection means for repeatedly sweeping the beam across the aperture to generate a plurality of optical pulses emerging therethrough. The first and second optical deflection means are serially arranged in the beam path between the beam forming means and the aperture defining means to additively deflect the beam. The first optical deflection means serves to sweep the beam across the aperture at pre-determined times to define a plurality of reference occurrence time positions for the emerging pulses. The second optical deflection means is responsive to a modulating signal to proportionately offset the emergence of each pulse from its reference occurrence time by algebraically adding to the beam deflection.

The optical deflection means may comprise a reflective surface, as illustrated in one embodiment, or a refractive medium, as shown in a second embodiment.

As will become apparent from the following description, the modulator of the present invention is particularly suited for optical telecommunication systems, in that the optical signal may be directly modulated by an acoustical signal such as a human voice without the intermediate conversion to an electrical signal, which has heretofore been necessary to modulate the optical source.

Other advantages and features of the invention will be apparent from the following description of the preferred embodiments which is to be read in conjunction with the following drawings.

DESCRIPTION OF THE DRAWINGS

FIG. 3 is a block diagram of a PPM signal receiver for decoding the modulated optical signal.

FIG. 4 is a graphic illustration of the signal waveforms associated with the circuits of FIGS. 2 and 3.

DESCRIPTION OF THE PREFERRED EMBODIMENTS

Figure 1A:
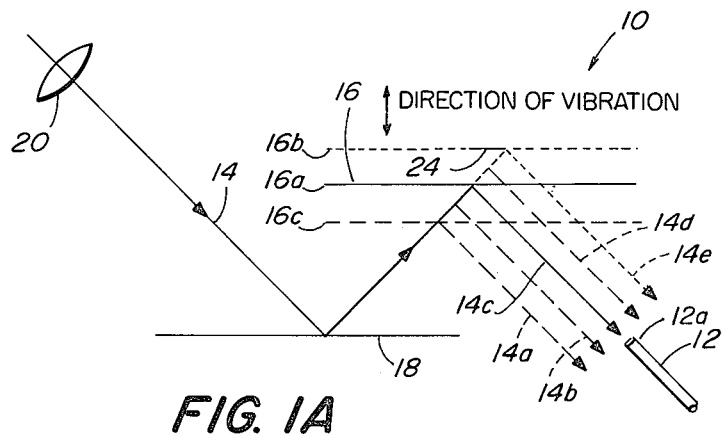
FIGS. 1A and 1B are schematic illustrations of the operating principal of an optical pulse position modulator according to the invention.

In describing the present invention, like reference numerals will be used throughout the drawings to identify identical elements.

Figure 1B:
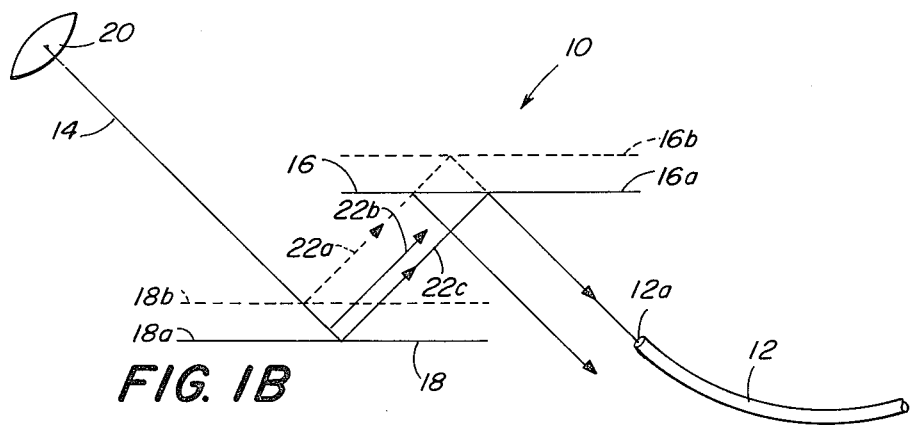

Turning to FIGS. 1A and 1B, an optical pulse position modulator, shown generally at 10, is coupled to an optical fiber 12. The operation of the modulator 10 may be most conveniently explained by first considering the generation of an unmodulated optical signal in accordance with the invention.

Turning first FIG. 1A, which schematically illustrates the operation of the modulator in the absence of a modulating signal, the beam 14 is deflected by a pair of reflective surfaces 16, 18 which are serially arranged in the beam path between a beam forming means 20 and an aperture 12a formed at the end of the fiber 12. The surfaces 16, 18 are movable along the beam path, the surface 16 being shown as movable between positions 16b and 16c through a nominal position 16a.

The reflecting surface 16 is vibrated between positions 16b and 16c in an oscillatory manner to sweep the beam 14 across the aperture 12a at a plurality of instances which are hereinafter referred to as reference times. A plurality of optical pulses are thereby periodically coupled into the fiber 12 at a rate equal to twice the frequency of the surface 16 vibration.

It may be observed in FIG. 1A, that the beam 14 is reflected along one of a plurality of light paths, shown illustratively as 14a–e which correspond to a related position of the surface 16. Specifically, the paths 14a–e extend from respective points of incidence of the beam 14 which vary with the surface 16 position and form a locus 24 of points. Accordingly, as the sequential positions of the surface 16 are time-phase related, so are the corresponding points of incidence along locus 24 and the corresponding paths 14a–e.

It may be particularly noted that in the absence of a modulating signal, an optical pulse is coupled into the fiber 12 when the beam 14 is reflected along path 14c and, accordingly, when the reflective surface 16 is in its nominal position 16a.

The significance of the phase relation will be apparent in the remaining description which, with reference to FIG. 1B, describes the manner in which the optical pulses are position modulated.

With reference to FIG. 1B, the second reflective surface 18 is now shown as movable in response to a modulating signal, and along the path of the incident beam 14, between its previously shown nominal position 18a and position 18b. Naturally, the nominal position 18a could alternately be located between a pair of end positions similar to those of the surface 16.

Because the frequency of the modulating signal is less than that of the surface 16 vibration, the reflective surface 16 may be considered, for explanatory purposes as stationary during one cycle of vibration.

As is evident from FIG. 1B, and in a manner similar to that of the surface 16, the surface 18 reflects the beam 14 along one of a plurality of essentially parallel, position-related paths 22a and 22b. The position of the reflective surface 18 thereby varies the point of incidence of the beam 14 on the surface 16 and, consequently, the path 14a–e taken by the beam 14 after its reflection therefrom. The resultant phase shift in the pulse occurrence time may be appreciated by noting, in FIG. 1B, that the beam 14 is not coupled into the fiber 12 until the reflective surface 16 has moved from its nominal position 16a, where coupling occurred in the absence of a modulating signal, to position 16b.

The modulating signal which causes the movement of the surface 18 may be electrical or mechanical, but a principal object of the invention is achieved by the application to surface 18 of an acoustical signal to provide a direct modulation of the optical pulse therewith. In a telecommunications systems, for example, where the acoustical signal is a human voice, the embodiment described above lends itself to a compact telephone handset that produces a voice modulated optical PPM signal. For that application, the transmitter diaphragm would be a polished reflector, functioning as reflector 18. In operation, the voice intensity would be represented by the magnitude of the phase shift from the reference time, while voice frequency would be represented by the relative phase shift between pulses.

Having described one embodiment and its principal of operation, attention is next directed towards design considerations. It may first be noted, that the direction of the phase shift is related to the direction of movement of the surface 16. In FIG. 1B, for example, a shift of the surface 18 from position 18a to position 18b will generate a leading pulse when the reflector 16 is at position 16b and moving towards position 16a, while a lagging pulse is generated when the reflector 16 is at position 16b and moving away from 16a. It may be advantageous under certain circumstances to generate optical pulses which alternate between leading and lagging positions since the average pulse position remains fixed regardless of modulation and the information thereby provided about the reference pulse position simplifies the design of the PPM receiver.

The alternating positions of the modulated pulse may, however, be eliminated, if desirable, in several ways. First, the light source could be turned on and off in sync with reflector 16 so that only every second pulse would be generated. This would be generally unsatisfactory, however, since one object of the present invention is the utilization of a continuous light source. Secondly, an additional reflector or a barrier could be added, and moved in sync with reflector 16 to deflect every other pulse, or one of the present reflectors 16, 18 could be additionally moved orthogonal to its present movement. Thirdly, reflector 16 could be mounted on a spinning wheel to sweep the beam across the aperture once per revolution.

Figure 2:
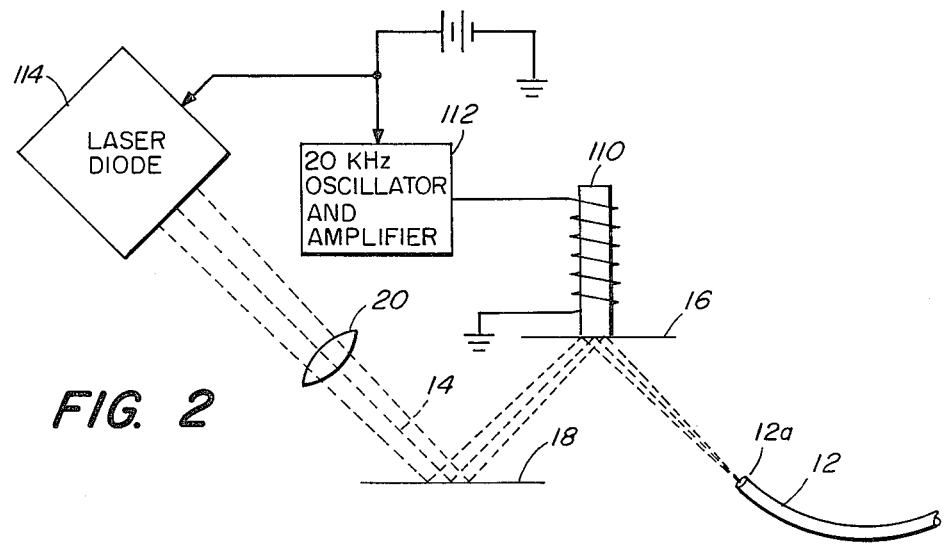
FIG. 2 is a schematic representation of the circuit of an optical pulse position modulator constructed in accordance with the invention.

FIG. 2 schematically illustrates a circuit of an optical pulse position modulator constructed in accordance with the invention. The operation of the circuit will be explained in conjunction with FIG. 4 which graphically illustrates particular waveforms associated therewith. Turning to FIG. 2, the mirror 16 is shown being vibrated by an ultra-sonic transducer 110, such as a voice coil or piezoelectric element. The transducer 110 is driven by a 20kHz signal from an oscillator 112.

The beam of light 14 is generated by a laser diode 114 and focused by the lens 20. The mirror 16 sweeps the beam 14 across the aperture 12a of the optical fiber 12 to define a series of pulses emerging therethrough. The unmodulated PPM signal comprises a series of pulses 212 (FIG. 4) emerging at a plurality of reference times. The pulses 212 are conveniently labeled "U" and "D" in FIG. 4 to indicate that they are respectively generated when the mirror 16 is moving up or down in the Figure. It may be appreciated that the 20kHz oscillator accordingly generates a 40kHz pulse frequency.

The mirror 18, which comprises a polished surface, which may be affixed to the microphone diaphragm of a telephone handset, varies the occurrence times of the emerging pulses in the manner previously described. For simplicity, a series of pulses 214 which have been modulated by an audio signal having a sinusoidal waveform 210 (FIG. 4) is illustrated for visual comparison with the reference pulses 212. It may be noted that the positive phase of the sinusoidal waveform 210 causes a delay of the "U" pulses by an interval proportional to the instantaneous magnitude of the waveform 210, while the negative phase results in earlier occurring "U" pulses. Conversely, the "D" pulses occur earlier while the waveform 210 is in its positive phase and later when the waveform 210 is in its negative phase.

Turning to FIG. 3, a receiver for receiving and decoding the optical PM signals generated in accordance with the invention is schematically illustrated. The modulated pulses 214 (FIG. 4) emerge from the optical fiber 12 and are converted to a series of corresponding electrical pulses 218 by a photodetector 116. The electrical pulses 218 are inputted to an amplifier and slicer 120, which may conveniently be a type SN75107 high gain differential amplifier having a TTL gate circuit output. The amplifier 120 converts the pulses of the signal 218 to a series of logic level pulses 222 which are then fed into a binary divider 124. The divider 124 may conveniently be a bistable element, such as a flip flop, having an output state that changes with each input pulse, and serves to eliminate the alternating positions of the modulated pulses. The emerging signal 226 (FIG. 4) is then passed through a low pass filter 128 having a cut-off frequency of approximately 4kHz to attenuate frequency components above the audio range. The signal 230 emerging from the filter will have sinusoidal waveform 230 (FIG. 4) which may be amplified by an amplifier 132 to drive a speaker or telephone receiver 134.

Many design considerations are apparent to one skilled in the art. For example, the initial output state of the divider 124 may be either of its two bistable modes, so that the waveform 214 and, consequently, waveform 226 would be inverted. Since the output signal 230 is an audio signal, however, the signal inversion is of no significance. It may be additionally appreciated that other oscillator frequencies may be utilized to drive the mirror 16. It should be noted, however, that an inverse relationship exists between the oscillator frequency and the inherent distortion in the output signal 230.

Many variations and modifications of the described embodiment are obvious to one skilled in the art and are within the spirit of the invention. For example, the reflectors 16, 18 could be rotatable about axes perpendicular or parallel to the plane of the page to vary the deflection angle of the beam.

Additionally, the beam could be deflected by material having an index of refraction which varies in response to pressure, temperature, or acoustic surface waves, such as those generated by electro-acoustic transducers.

I claim:

1. An optical communication system including in combination
   an optical pulse position modulator;
   an optical fiber; and
   an optical pulse position receiver;
   said optical pulse position modulator comprising
   means forming a light beam,
   first and second optical deflection means for repeatedly sweeping the light beam across one end of the optical fiber to produce a plurality of optical pulses thereat, the first and second optical deflection means being serially arranged in the beam between the beam-forming means and the one end of the optical fiber to additively deflect the beam,
   the first optical deflection means including a first reflective surface located in the beam path and movable to variably deflect the beam in a direction to traverse the one end of the optical fiber, and means for cyclically moving the first reflective surface at a predetermined rate to repeatedly traverse the one end of the optical fiber with the beam at predetermined times to define a plurality of reference occurrence times for the optical pulses at the one end of the optical fiber,
   the second optical deflection means including a second reflective surface movable in response to a modulating signal to continuously alter the incidence of the beam on the first reflective surface of the first optical deflection means to proportionately offset each pulse at the one end of the optical fiber from its reference occurrence time by algebraically adding to the beam deflection;
   said optical fiber transmitting optical pulses produced at the one end to the other end thereof;
   said optical pulse position receiver comprising
   converting means located adjacent to the other end of the optical fiber for converting optical pulses transmitted through the optical fiber to corresponding electrical pulses, and
   decoding means coupled to the converting means for decoding the electrical pulses to reproduce the modulating signal.

2. An optical communication system in accordance with claim 1 wherein
   the first reflective surface is movable in a generally parallel direction with the beam at its point of incidence to cyclically direct the reflected beam along a plurality of essentially parallel and time-phased paths which sweep across the one end of the optical fiber;
   the means for cyclically moving the first reflective surface includes means for vibrating the first reflective surface;
   the second reflective surface is movable in an essentially parallel direction with the light beam incident thereon; and
   the decoding means includes
   a divide-by-two dividing means coupled to the converting means and operable to alternate between two output states in response to electrical pulses received, and
   a low pass filter means coupled to the divide-by-two dividing means.

3. An optical communication system in accordance with claim 2 wherein the second reflective surface is directly activated by an acoustical modulating signal.

* * * * *